US008320364B2

United States Patent
Wu et al.

(10) Patent No.: US 8,320,364 B2
(45) Date of Patent: Nov. 27, 2012

(54) CONTROL OF BIT-RATE AND PACKET DUPLICATION IN A REAL-TIME MEDIA STREAM

(75) Inventors: Wai Keung Wu, Hong Kong (CN); Siu Ming Fu, Hong Kong (CN); Siu Kai Yeung, Hong Kong (CN)

(73) Assignee: Hong Kong Applied Science and Technology Research Institute Co., Ltd., Shatin, New Territories (HK)

( * ) Notice: Subject to any disclaimer, the term of this patent is extended or adjusted under 35 U.S.C. 154(b) by 423 days.

(21) Appl. No.: 12/638,204

(22) Filed: Dec. 15, 2009

(65) Prior Publication Data

US 2011/0142034 A1 Jun. 16, 2011

(51) Int. Cl.
*H04L 12/66* (2006.01)
(52) U.S. Cl. .......................................... 370/352
(58) Field of Classification Search .......... None
See application file for complete search history.

(56) References Cited

U.S. PATENT DOCUMENTS

| 6,289,054 | B1 | 9/2001 | Rhee |
| 6,421,387 | B1 | 7/2002 | Rhee |
| 7,103,669 | B2 | 9/2006 | Apostolopoulos |
| 7,257,644 | B2 | 8/2007 | Simonnet et al. |
| 2004/0114576 | A1 | 6/2004 | Itoh et al. |
| 2005/0013249 | A1 | 1/2005 | Kong et al. |
| 2006/0018257 | A1* | 1/2006 | Seo .............................. 370/232 |
| 2007/0280217 | A1 | 12/2007 | Flanagan et al. |

* cited by examiner

*Primary Examiner* — Chirag Shah
*Assistant Examiner* — Minh-Trang Nguyen
(74) *Attorney, Agent, or Firm* — Leydig, Voit & Mayer, Ltd.

(57) ABSTRACT

A method for controlling a real-time media stream between a sender and a receiver. The method includes streaming, from the sender, media packets over a network at a bit-rate, determining at the sender a loss-rate for the streamed media packets not received at the receiver. The sender optionally generates duplicate packets for a selected number of media packets and streams the duplicate packets over the network when the loss-rate is above a first loss-rate threshold, or varies the bit-rate of streaming the media packets over the network when the loss-rate is above a second loss-rate threshold.

12 Claims, 8 Drawing Sheets

Packets sent from Sender end

Packets received at Receiver end

CONTROL OF BIT-RATE AND PACKET DUPLICATION IN A REAL-TIME MEDIA STREAM

FIELD OF THE INVENTION

The present invention relates to the streaming of real-time media over IP networks, and in particular to the control of bit-rate and packet duplication in a real-time media stream.

BACKGROUND TO THE INVENTION

Streaming of real-time video content over IP networks, such as the Internet, has become increasingly popular since the introduction of video conference and video call. Typically video is compressed and sent over the internet as a series of small packets using Real-time Transport Protocol (RTP) over User Datagram Protocol (UDP). UDP is a simple and efficient protocol that allows two computers on a multi node network, such as the Internet, to exchange data without the need to set up special transmission channels or data paths. One drawback of this method however, is that there is no mechanism within the protocol to guarantee delivery. It is up to the receiving end of the packet stream to detect loss or corruption and recover data using error correction techniques, for example, forward error correction (FEC).

Compressed video streams are very sensitive to transmission errors because of the use of predictive coding and variable length coding (VLC). Various methods are available for error concealment and resilience, but these increase CPU loading at both the sending and receiving ends and transmission bandwidth requirements. Such methods are, in particular, not suitable for wireless or handheld applications such as smart phones or mobile internet devices (MID). The re-transmission of lost packets based on acknowledgment from the receiver is not an option for real-time multimedia applications such as video conference or video calls because they impose very strict requirement on voice latency and the video contents should be synchronized with the voice (lip synchronization).

In some public video call servers that supports voice and video over IP (V2oIP), a certain portion of uplink and downlink bandwidth is reserved for voice calls because people usually prefers good voice quality over video quality in a network environment where the bandwidth is limited. In this case, those servers may drop video packets and reserve the remaining bandwidth for voice call. Therefore it is very common that the voice packet loss rate is very low but with high loss rate on video packets during the video call. Moreover, network paths may drop both video and voice packets. Usually loss of voice packets can be masked by packet loss concealment (PLC) while loss of video packets is more difficult to handle.

One type of error correction methods that is used to combat the problem of video packet loss in V2oIP is packet duplication. The idea is the sender will send duplicate copies of important packets together with the original packets such that enough video packets for the video stream can be received and reassembled accurately at the receiver even in a high packet loss network condition. A drawback of this approach is that it increases the bandwidth of the streamed video, which in turn can result in increased packet loss if the network loading is increased. More importantly, when video packet duplication is used it is very hard to know the accurate packet loss rate based on RTCP report only because duplicate packets have the same sequence numbers and timestamps as their original packets.

SUMMARY OF THE INVENTION

It is an objective of the present invention to provide a method of controlling the bit-rate and packet duplication of a real-time media stream that ameliorates video packet loss rate and maximize video quality. It is a further object of the present invention to provide a method of controlling the bit-rate and packet duplication of a real-time media stream that ameliorates video packet loss rate and maximize video quality in a network situation that video packet loss rate is above a threshold value (e.g. 3%) and the video bandwidth may be underutilized. It is yet a further object of the present invention to at least provide the public with a useful alternative to current error concealment and error resilience methods for real-time media streaming.

In a first aspect the invention provides a method for controlling a real-time media stream between a sender end and a receiver end including streaming from a sender end a plurality media packets over a network at a bit-rate, determining at the sender end a loss-rate for the streamed media packets not received at a receiver end, and generating duplicate packets for a selected number of media packets and streaming the duplicate packets over the network when the loss-rate is above a first loss-rate threshold, and varying the bit-rate of streaming the plurality media packets over the network when the loss-rate is above a second loss-rate threshold.

Preferably, determining a loss-rate for the streamed media packets not received at a receiver end involves receiving at the sender end a RTP Control Protocol Extended Report transmitted from the receiver end, using data in the RTP Control Protocol Extended Report for determining a total number of packets R received at a receiver end including any duplicate packets, and calculating the loss-rate.

Preferably, the method further includes determining the second loss-rate for a second period of the streaming.

Preferably, varying the bit-rate of streaming the plurality media packets over the network when the loss-rate is above a second loss-rate threshold comprises varying the bit-rate when a difference between the first and second loss-rates is above the second loss-rate threshold.

Preferably, varying the bit-rate when a difference between the first and second loss-rates is above the second loss-rate threshold comprises increasing the bit rate when the second loss rate is less than the first loss rate, and decreasing the bit rate when the second loss rate is greater than the first loss rate.

Preferably, the method further comprises stopping the generating duplicate packets after the loss-rate is above a second loss-rate threshold.

Preferably, the method further comprises determining a second loss-rate for the streamed media packets and when the second loss-rate is above the first loss-rate threshold and below the second loss rate threshold, increasing the selected number of media packets that are duplicated.

In a second aspect the invention provides a method for controlling a real-time media stream between a sender end and a receiver end, comprising streaming from a sender end a plurality media packets over a network at a bit-rate, calculating a first loss-rate for the streaming media packets not received at a receiver end for a first period of the streaming, repeating the calculating step for successive periods of the streaming until the calculated loss rate is above a first loss rate threshold, if the difference between the two most recently calculated loss rates is less than a second loss rate threshold, generating duplicate packets for a selected number of media packets and streaming the duplicate packets over the network, and if the difference between the two most recently calculated loss rates is greater than the second loss rate threshold, varying the bit-rate of streaming the plurality media packets over the network.

In a second aspect the invention provides a method for controlling a real-time media stream between a sender end and a receiver end, comprising streaming from a sender end a plurality media packets over a network at a bit-rate, receiving at the sender end a RTP Control Protocol Extended Report transmitted from the receiver end, using data in the RTP Control Protocol Extended Report for determining a total number of packets R received at a receiver end including any duplicate packets, and calculating the loss-rate L as L=(S−R)/S, where S is a total number of streamed form the sender end. generating duplicate packets for a selected number of media packets and streaming the duplicate packets over the network when the loss-rate is above a second loss-rate threshold, and varying the bit-rate of streaming the plurality media packets over the network when the loss-rate is above a second loss-rate threshold.

Further aspects of the invention will become apparent from the following description and drawings which are given by way of example only to illustrate the invention.

BRIEF DESCRIPTION OF THE DRAWINGS

The invention will now be described with reference to the accompanying drawings in which.

DESCRIPTION OF THE PREFERRED EMBODIMENTS

Figure 1:
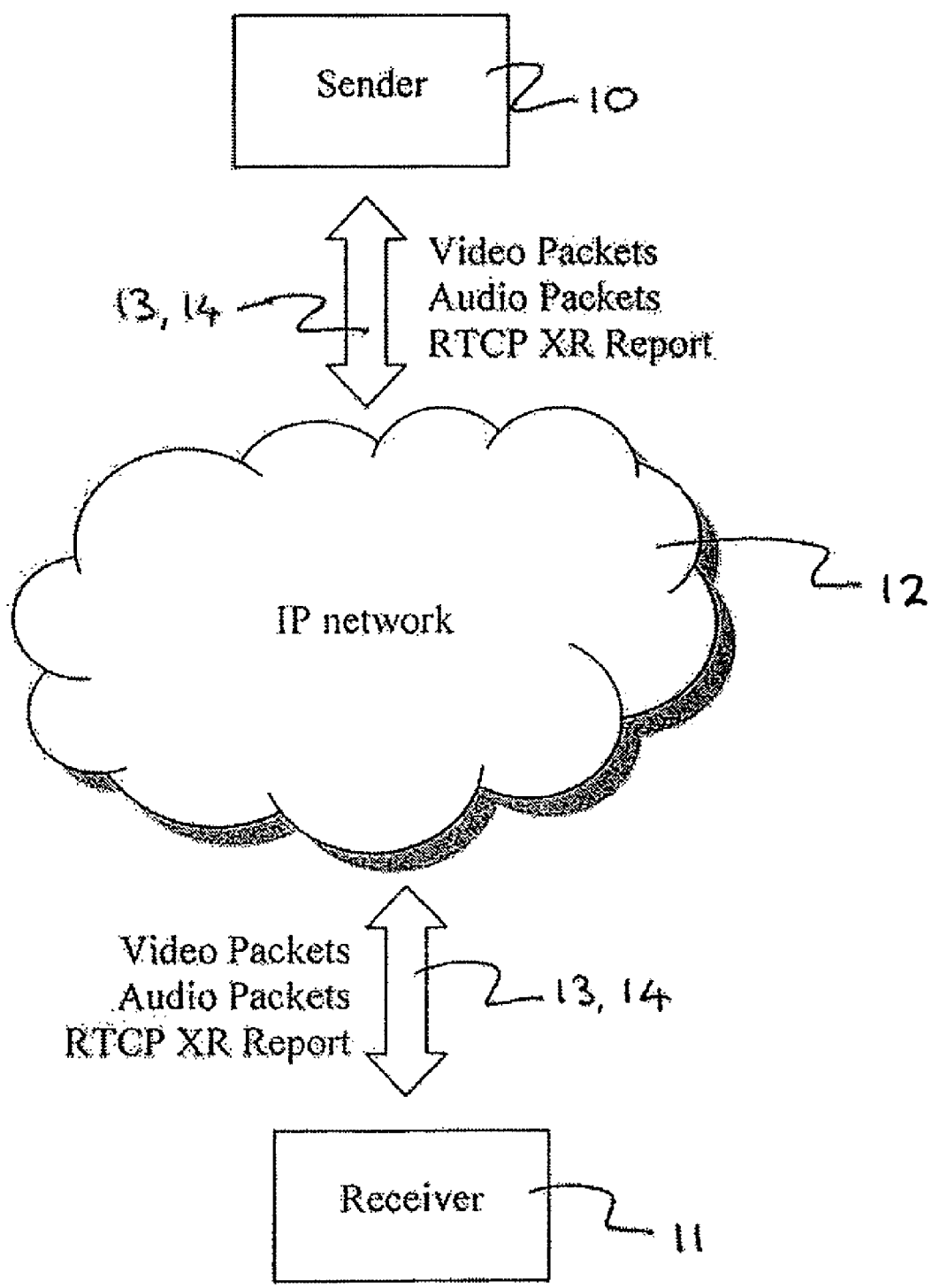
FIG. 1 is a schematic overview of sender and receiver nodes in a real-time media stream over an IP network.

Before any embodiments of the invention are explained in detail, it is to be understood that the invention is not limited in its application to the details or arrangements set forth in the following description or illustrated in the drawings. The invention is capable of other embodiments and of being practiced or of being carried out in various ways. Also, it is to be understood that the phraseology and terminology used is for the purpose of description only and should not be regarded as limiting.

The following discussion on video compression is given to help understanding the criteria used in the preferred example of the invention and is not intended to limit the scope of use or functionality of the invention. The skilled addressee will understand that the current invention can be used in media streaming applications with or without compression, or using various different compression methods.

In the preferred embodiment of the invention video is streamed in real-time over a network using inter-frame compression according to H.263, which is a low bit-rate video compression standard originally designed for videoconferencing. The H.26x family of video coding standards was developed by the ITU-T Video Coding Experts Group (VCEG). Such standards are well known in the art and within the knowledge and understanding of the skilled addressee.

In H.26X family of video codec or most modern codec, there are two types of compression, namely, inter-frame compression and intra-frame compression. Inter-frame compression (P-frame) is a compression technique applied to a sequence of video frames, rather than a single image. In general, relatively little changes from one video frame to the next in a video call or video conferencing. Inter-frame compression exploits the similarities between successive frames, known as temporal redundancy, to greatly reduce the bit rate needed to transmit the video. Intra-frame compression (1-frame) is compression applied to still images and exploits the redundancy within the image, know as spatial redundancy. Generally, frames can be grouped into sequences called group of pictures (GOP). A GOP is an encoding of a sequence of frames that contain all the information that can be completely decoded within that GOP.

Video packet loss is very common for V2oIP, particularly using public video conference server over the Internet. Some public video servers will drop video packets to reserve bandwidth for voice packets. Packet loss on video causes severe video quality degradation, especially video packet loss on I-frame because all P-frames within the GOP cannot be decoded properly. To alleviate this problem, packet duplication of important frame data is a solution. Typically an H.263 encoded I-frame for Common Intermediate Format (CIF) resolution occupies 3 to 10 RTP packets assuming IP network interface has 1500 bytes maximum transmission unit (MTU). When each of these RTP packets of an I-frame is duplicated once, and these duplicated packets are sent together with the original packets, the receiver can reconstruct the I-frame without errors if for each of the constituent packets, either the original or the duplicate copy or both are received. The theoretical probability is given by $(1-r^2)^n$, where r is packet loss rate of the underlying network and n is the number of UDP packets spanned by the I-frame, assuming packet loss events are independent. This probability represents the whole I-frame can be constructed correctly. Table 1 below summarizes this probability in percentage as a factor of the number of UDP packets spanned by an I-frame versus network packet loss rate with I-frame packet duplication. As show in Table 1, for example, when the packet loss rate is 10% and the I-frame is carried by 4 RTP packet payloads, there is a very high probability (96.06%) that the I-frame can be constructed correctly.

TABLE 1

| | | \multicolumn{10}{c}{Number of RTP packets spanned by an I-frame} |
|---|---|---|---|---|---|---|---|---|---|---|---|
| | | 1 | 2 | 3 | 4 | 5 | 6 | 7 | 8 | 9 | 10 |
| Packet loss rate | 5% | 99.75 | 99.50 | 99.25 | 99.00 | 98.76 | 98.51 | 98.26 | 98.02 | 97.77 | 97.53 |
| | 10% | 99.00 | 98.01 | 97.03 | 96.06 | 94.15 | 94.15 | 93.21 | 92.27 | 91.35 | 90.44 |
| | 15% | 97.75 | 95.55 | 93.40 | 91.30 | 89.24 | 87.24 | 85.27 | 83.36 | 81.48 | 79.65 |
| | 20% | 96.00 | 92.16 | 88.47 | 84.93 | 81.54 | 78.28 | 75.14 | 72.14 | 69.25 | 66.48 |
| | 25% | 93.75 | 87.89 | 82.40 | 77.25 | 72.42 | 67.89 | 63.65 | 59.67 | 55.94 | 52.45 |
| | 30% | 91.00 | 82.81 | 75.36 | 68.57 | 62.40 | 56.79 | 51.68 | 47.03 | 42.79 | 38.94 |

Empirical data obtained by the inventors suggests that for a typical video stream, good quality video can still be reproduced with a packet loss rate of up to 3%.

In order to improve the video quality when the network loss rate is above a predetermined threshold—three percent (3%) in the preferred embodiment of the invention—the I-frame packets are duplicated and transmitted immediately after transmission of corresponding original I-frame packets. However, sending duplicate packets significantly increases the media stream bit-rate if the number of frames per second is kept constant. This can have a further detrimental impact on the packet loss rate. Accordingly, current invention provides for control of both the degree of packet duplication and the media stream bit-rate depending on the network loss rate.

Figure 2:
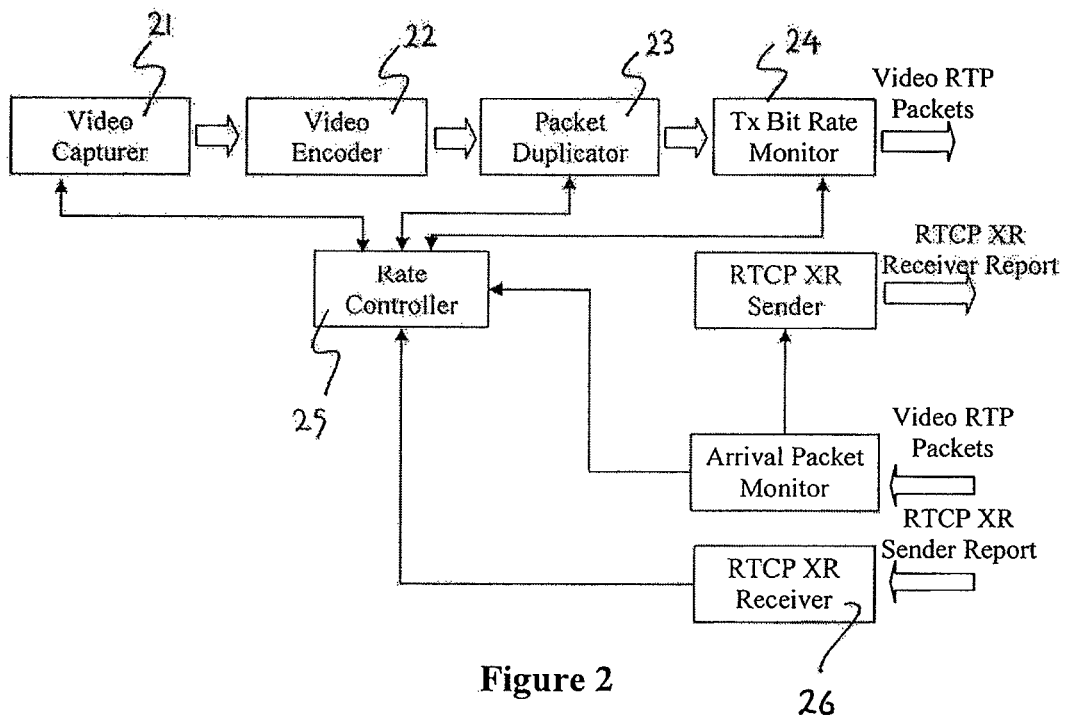
FIG. 2 is a schematic illustration of the bit-rate monitoring and packet duplicator system architecture for a control method according to the invention.

FIG. 1 illustrates a basic view of the environment of the invention. A sender 10 is streaming video packets 13 and optionally audio packets 14 over an IP network 12 to a receiver 11. The sender 10 and receiver 11 may be any network capable device but in a preferred embodiment of the invention they are smart phones or VoIP phones with video capability (e.g. V2oIP). FIG. 2 shows a typical architecture of a system for controlling the bit rate and duplication of a media stream according to the invention. The architecture includes a video capturer module 21 for capturing live video from a video input device such as a video camera (not shown). The video is encoded by a video encoder module 22 and is prepared in RTP packets for transmission. A packet duplicator 23 duplicates video packets under control of the rate controller 25 and the original and duplicate packets are transmitted over the network. A transmission bit rate monitor 24 monitors the transmission bit rate to avoid a network overload. The rate controller 25 controls the video capturer 21, encoder 22, packet duplicator 23 and bit rate monitor 24 to adapt to the network loss conditions by dynamically adjusting the bit rate of encoded video and degree of packet duplication, an RTCP-XR receiver 26 receives and interprets network/video quality information from the receiving end of the media stream and calculates the accurate packet loss rate.

The actual network loss rate can be calculated from the real time control protocol extended report (RTCP-XR) issued by the receiver. In the following discussion, packet loss rate means the ratio of the number of packets not received at the receiving end to the number of packets sent by the sending end, within an inclusive range of packet sequence numbers. To estimate this packet loss rate (R), the sending end needs the packet arrival statistics provided by the receiver, and the outgoing packet information maintained by the sender. Normally, for each packet sequence number, the sender will send one packet to the receiver. However, in the case of packet duplication, the sender may send more than one packet for a single sequence number. In such cases, the sender maintains information on how many additional packets are sent for a particular sequence number, if any. The receiver periodically sends an RTCP-XR to the sender with packet arrival statistics. The RTCP-XR must include the following information 1. The starting and ending packet sequence numbers which defines the period from which the statistics are gathered.
2. The total number of packets lost.
3. The total number of duplicate packets received.

For each packet sequence number, during the time when the statistics are gathered, there are 3 possible situations:

1. No corresponding packet has been received (i.e. the packet is considered to be lost).
2. Exactly one packet has been received.
3. More than one packet has been received (i.e. packet duplication is detected).

In the following discussion on loss estimation using information from the RTCP-XR the following notation is used R—Estimated packet loss rate on the receiver side $S_n$—The starting sequence number of the interval within which the packet loss rate is estimated $S_{n+k}$—The ending sequence number of the interval within which the packet loss rate is estimated $P_L$—Total number of packets lost in the interval reported by the receiver $P_D$—Total number of duplicate packets received in the interval reported by the receiver $N_S$—Total number of normal packets sent by the sender within the interval. It must be equal to $S_{n+k}-S_n+1$.

$N_D$—Total number of duplicate packets sent by the sender within the interval

Figure 3A:
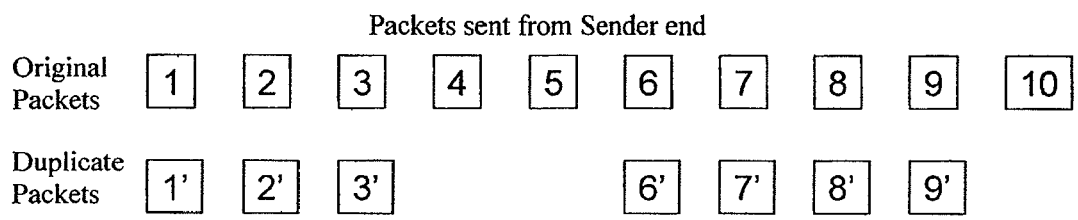
FIG. 3a is an illustration of sample packet duplication at a sending end of a media stream.
Figure 3B:
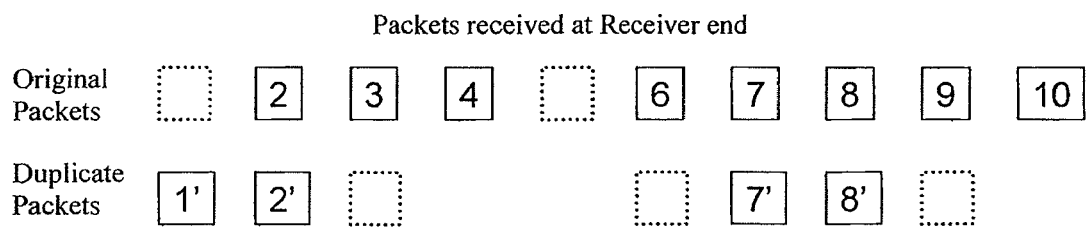
FIG. 3b is a corresponding packet arrival scenario at a receiving end of the media stream of FIG. 3a, FIG. 4 is a flow diagram of a method according to the invention for a initial network loss condition that check if the video quality will be affected.

N—Total number of packets sent by the sender within the interval, including normal and duplicate packets N' Estimated number of packets received by the receiver within the interval, taking into account the number of lost and duplicate packets Every time an RTCP-XR is received from the receiver, the sender estimates the packet loss rate on the receiver side. Firstly, the starting ($S_n$) and ending ($S_{n+k}$) sequence numbers are extracted which define the interval when packet loss rate is estimated. Using $S_n$ and $S_{n+k}$ the sender is able to calculate the total number of packets sent without duplication ($N_S$) by the formula $N_S=S_{n+k}-S_n+1$ The sender then looks up the duplicate packet information maintained by itself to determine the number of duplicate packets sent ($N_D$) during this sequence number interval. The sender is able to calculate the total number of packets sent (N) to the receiver within the interval, including duplicate packets, using formula $N=N_S+N_D$ In the best case, if every single packet sent is received by the receiver, N will be the total number of packets received by the receiver. With the information of packet loss ($P_L$) and packet duplication ($P_D$) the sender can estimate the actual number of packets N' received by the receiver by the formula $N'=N_S-P_L+P_D$ Therefore, the packet loss rate is estimated by $R=(N-N')/N$ This is illustrated in FIG. 3. The sender end sends 10 original packets 1-10 and duplicates of packets 1, 2, 3, 6, 7, 8 and 9. The total number of packets sent $N_S$ is 17, as shown in FIG. 3a. In FIG. 3b, original packets 1 and 5 and duplicate packets 3, 6 and 9 are lost in the network. The receiver only reports packet 5 as lost and packets 2, 7 and 8 as duplicates.

Therefore, the number and lost packet $P_L$ is 1 and the number of duplicate packet $P_D$ is 3. The total packet received N' is 10−1+3=12. The estimated packet loss rate R is (17−12/17)= 0.294 or 29.4%.

The loss rate R represents the actual packet loss rate of the link between sender and receiver at a particular time period. This preferred method is very important to provide an accurate packet loss measurement to the rate control method which will be described later. If the above method is not used, the apparent loss rate based on the standard RTCP is 10% because the receiver detects only packet 5 is lost. In other words, using standard RTCP for rate control will report a wrong packet loss rate that would mislead most video bit rate control methods that using packet duplication in tackling video packet loss problem.

When packet duplication is triggered, generally not all RTP packets for I-frame will be duplicated. As show in FIG. 3a, suppose RTP packet 1, 2, 3, 4 are belonged to the same I-frame and only packets 1, 2, and 3 are duplicated. In this case the degree of duplication is 0.75. The definition of the degree of duplication is number of duplicated packet divided by the number of RTP packet of important frames to be transmitted.

A preferred embodiment of the rate control method will now be described. As mentioned before, one purpose of this method is to optimize the video quality by I-frame RTP packet duplications when the video packet loss rate cannot be further reduced even when the bit rate is further lowered. Those skilled in the art will recognize that most rate control methods use a technique that lowers the bit rate (or frame rate) when the packet loss rate is high and increases the bit rate (or frame rate) when the packet loss rate is low. However, those rate control methods do not work in a situation where, for example, the video packet loss rate cannot be further reduced to a predetermined threshold value (3%) even when the bit rate lowers further because some public video conferencing servers drop the video packets to reserve the bandwidth for voice packet.

A flow diagram of the steps of the preferred method of the invention is shown in FIGS. 4 through 8. The objective of the method is to monitor the real-time packet loss rate via the RTCP-XR and adjust the bit-rate and/or trigger packet duplication to maintain maximum video quality. The flow chart is separated into different states for clarity. The following notations are used in flow charts.

MAX_BIT-RATE—The maximum bit-rate at which the sender can encode the raw video capture (e.g. 1 Mbit/s)
MAX_LOSS—The maximum video packet loss rate that the reconstructed video quality can be accepted (e.g. 3% for H.263+)
$B_i$—The current bit-rate to be captured and encoded using video codec. ($B_0$=MAX_BIT-RATE, assume the bit-rate is set to the highest initially)
$L_i$—The actual packet lost rate derived from RTCP XR report sent from the receiver ($L_0$=0.0)
$D_i$—The degree of packet duplication of important video data; the range is between 0 and 1.0
T—The threshold value to detect the change of packet loss rate
K—The bit-rate to be reduced or increased
S—The degree of packet duplication to be reduced or increased
M—A positive integer constant to control the sensitivity of triggering the packet duplication
N—A positive integer constant to control the sensitivity of stopping the packet duplication The algorithm begins at 'Start' in FIG. 4. In this mode the sender captures and encodes video frames at a rate of $B_{i-1}$ bits per second using the video capturer 21 and video encoder 22 respectively. If the calculated network loss rate $L_i$, which is derived from RTCP-XR report using the preferred method described before, is above the maximum loss rate MAX_LOSS then the algorithm enters the flow chart of FIG. 5. Otherwise the control algorithm loops through the control flow of FIG. 4 if the packet loss rate remains below the maximum loss rate, which in the preferred embodiment is 3%.

Figure 4:
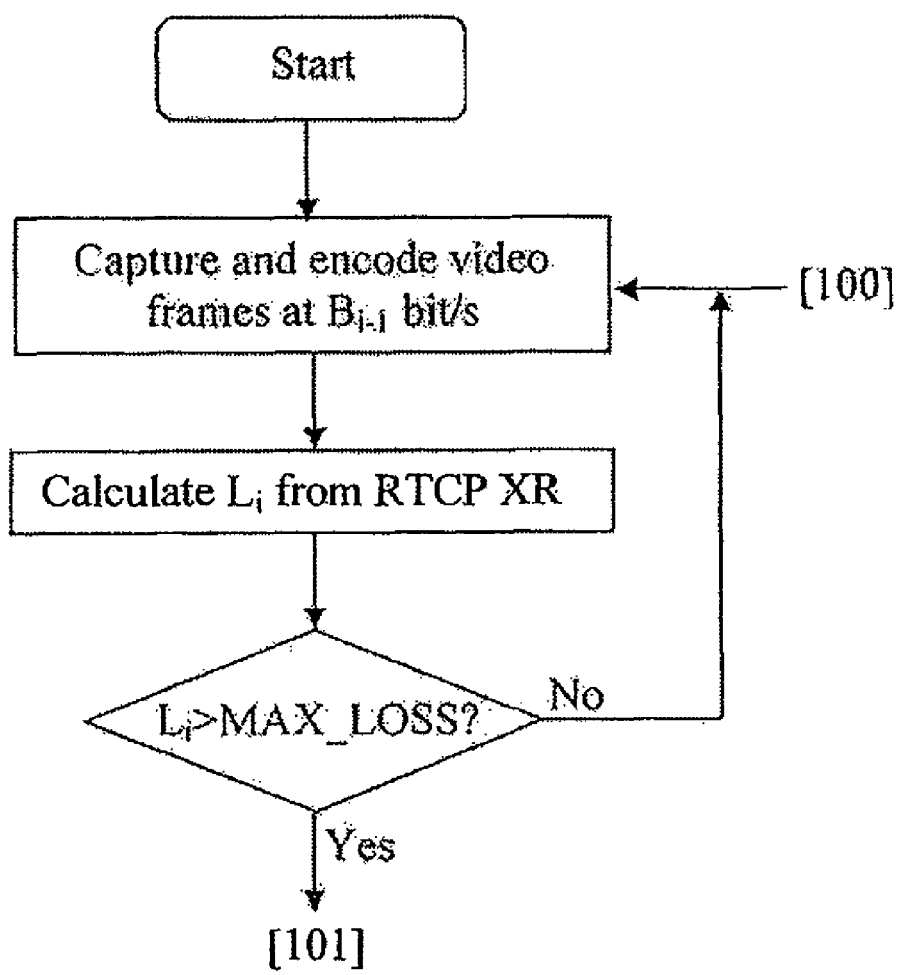
Figure 5:
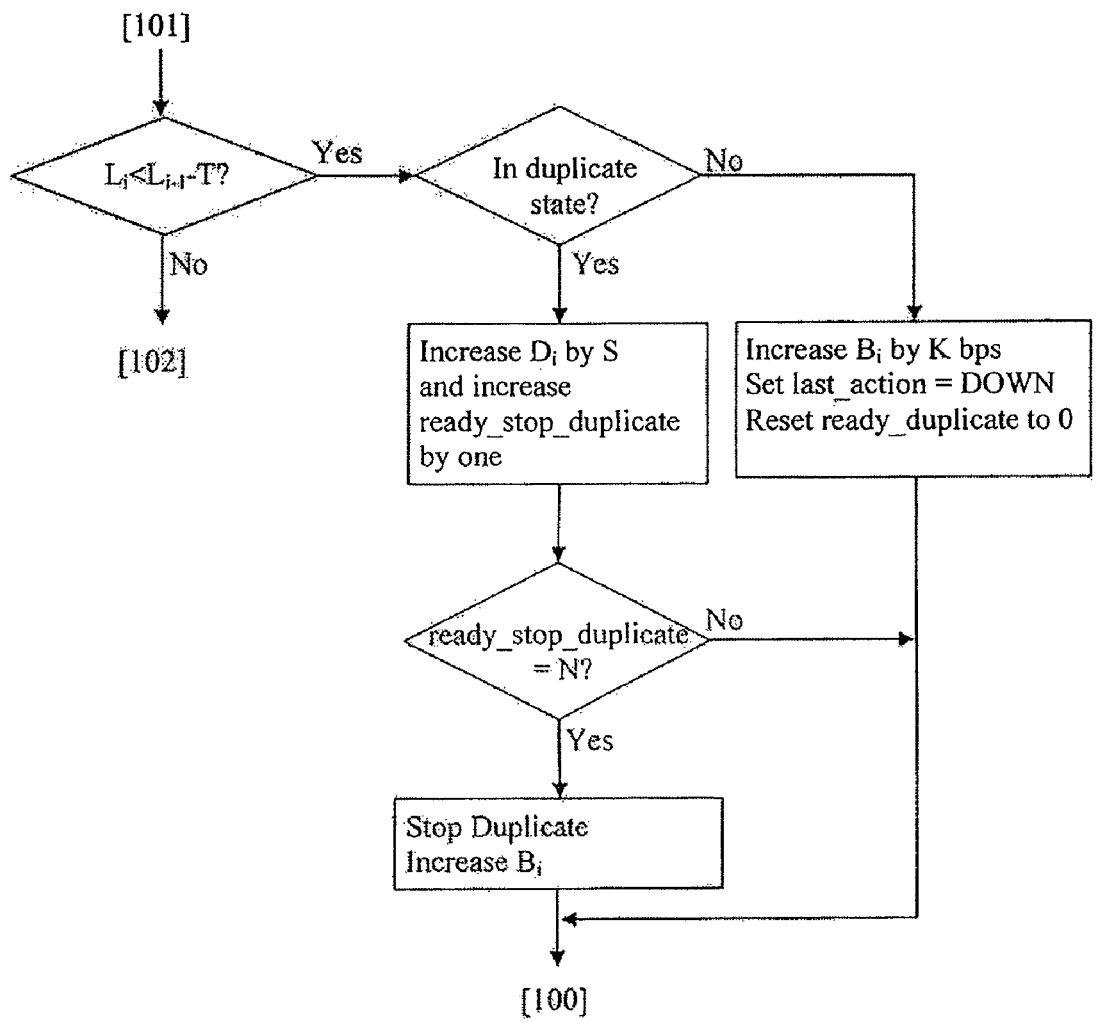
FIG. 5 is a flow diagram of the method for a network loss condition that adjust the video bit rate or packet duplication level if the current packet loss rate is lower than previous packet loss rate by threshold T.

FIG. 5 depicts the control flow where the calculated packet loss rate $L_i$ in any iteration exceeds the maximum loss rate and the decrease in loss rate $L_i$ is greater than threshold T (i.e. $L_i<L_{i-1}-T$). If the controller is not already in duplication mode then the bit-rate Bi is increased by K bits per second. The variable last_action is set to DOWN and the variable ready_duplicate is set to zero (0) to reset a start duplicate counter. Control then returns to the flow of FIG. 4 to begin the next iteration.

Continuing in FIG. 5, if the sending end is already in duplicate mode then the degree of packet duplication $D_i$ is increased by S and the variable ready_stop_duplicate is increased by 1. The maximum value of $D_i$ is 1. The algorithm then checks whether ready_stop_duplicate has reached the stop threshold N. If not, control flow returns to FIG. 4 to begin the next iteration. If ready_stop_duplicate has reached the threshold N then duplication is stopped and the bit-rate $B_i$ is increased to the bit rate that is the same as with duplication. It is because without video packet duplication, for the same video frame rate, the total bit rate will be lower. Increasing the bit rate $B_i$ can fully utilize the available bandwidth at loss rate $L_i$.

Figure 6:
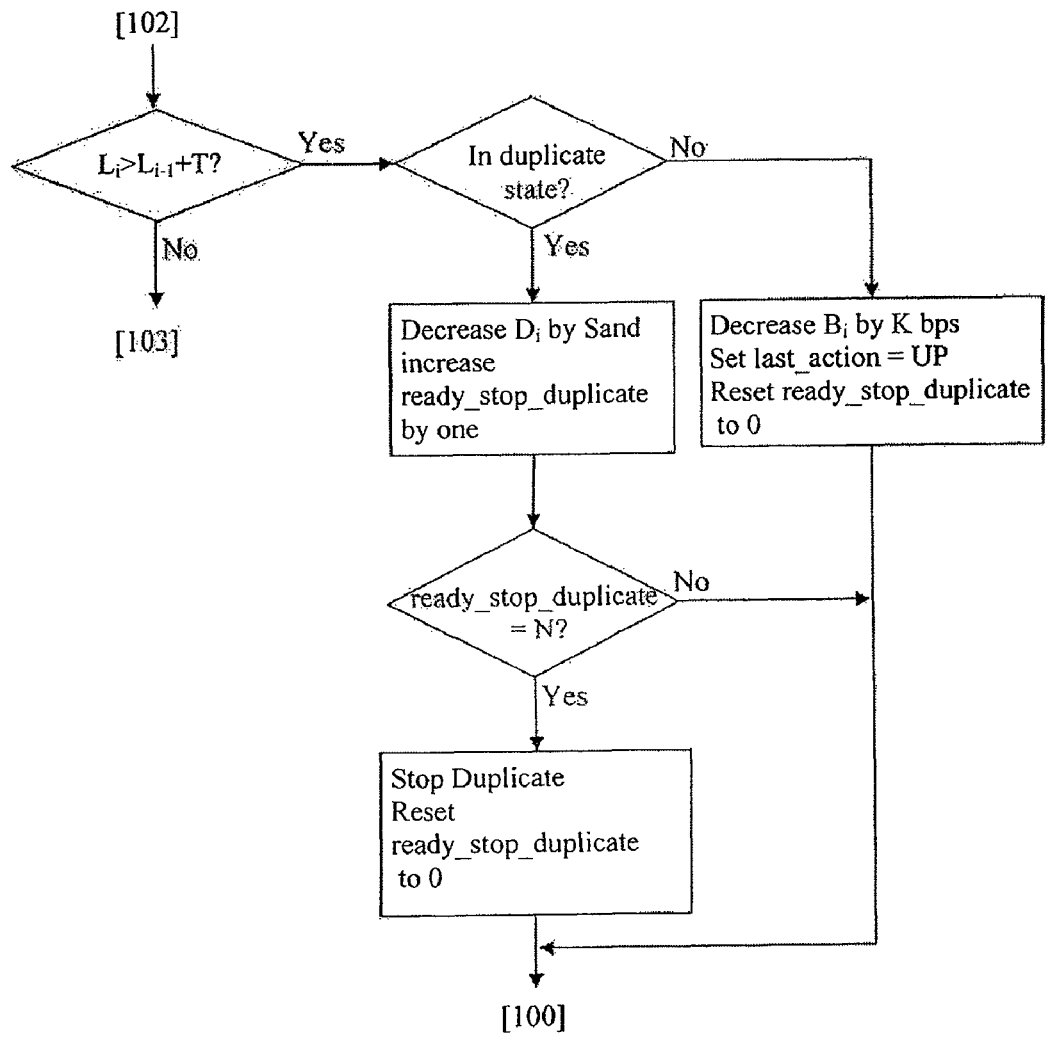
FIG. 6 is a flow diagram of the method for a network loss condition that adjust the video bit rate or packet duplication level if the current packet loss rate is larger than previous packet loss rate by threshold T.

FIG. 6 depicts the control flow if the packet loss rate is greater than the maximum loss and the increase in loss rate $L_i$ is greater than threshold T (i.e. $L_i>L_{i-1}+T$). If duplication mode is not already set then the bit-rate $B_i$ is decreased by K bits per second, the variable last_action is set to UP and ready_stop_duplicate is set to zero (0). Control flow returns to FIG. 4 for the next iteration.

Continuing in FIG. 6, if the sender is already in duplication mode then the degree of packet duplication is decreased and variable ready_stop_duplicate is increased by 1. If the variable ready_stop_duplicate reaches the threshold N for stopping packet duplication then packet duplication is stopped and ready_stop_duplicate variable is re-set to zero (0).

Figure 7:
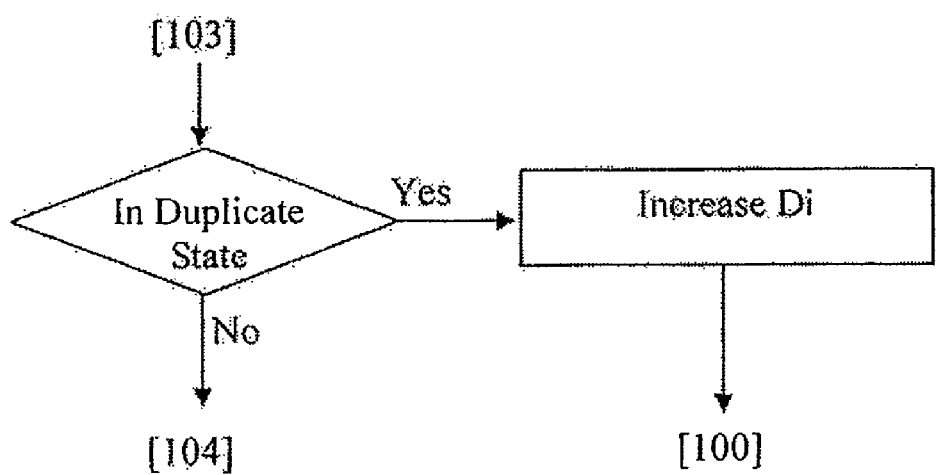
FIG. 7 is a flow diagram of the method for a network loss condition that adjust the packet duplication level if the current packet loss rate is close to the previous packet loss rate (within threshold T) and the packet duplication is started.

FIG. 7 depicts control flow for the conditions when the loss rate is above the maximum loss rate and the change in loss rate is less than threshold T, such as $|L_i-L_{i-1}|<T$. If duplication mode is already set the control simply increases the degree of packet duplication $D_i$ and returns to the flow of FIG. 4 for the next iteration.

Figure 8:
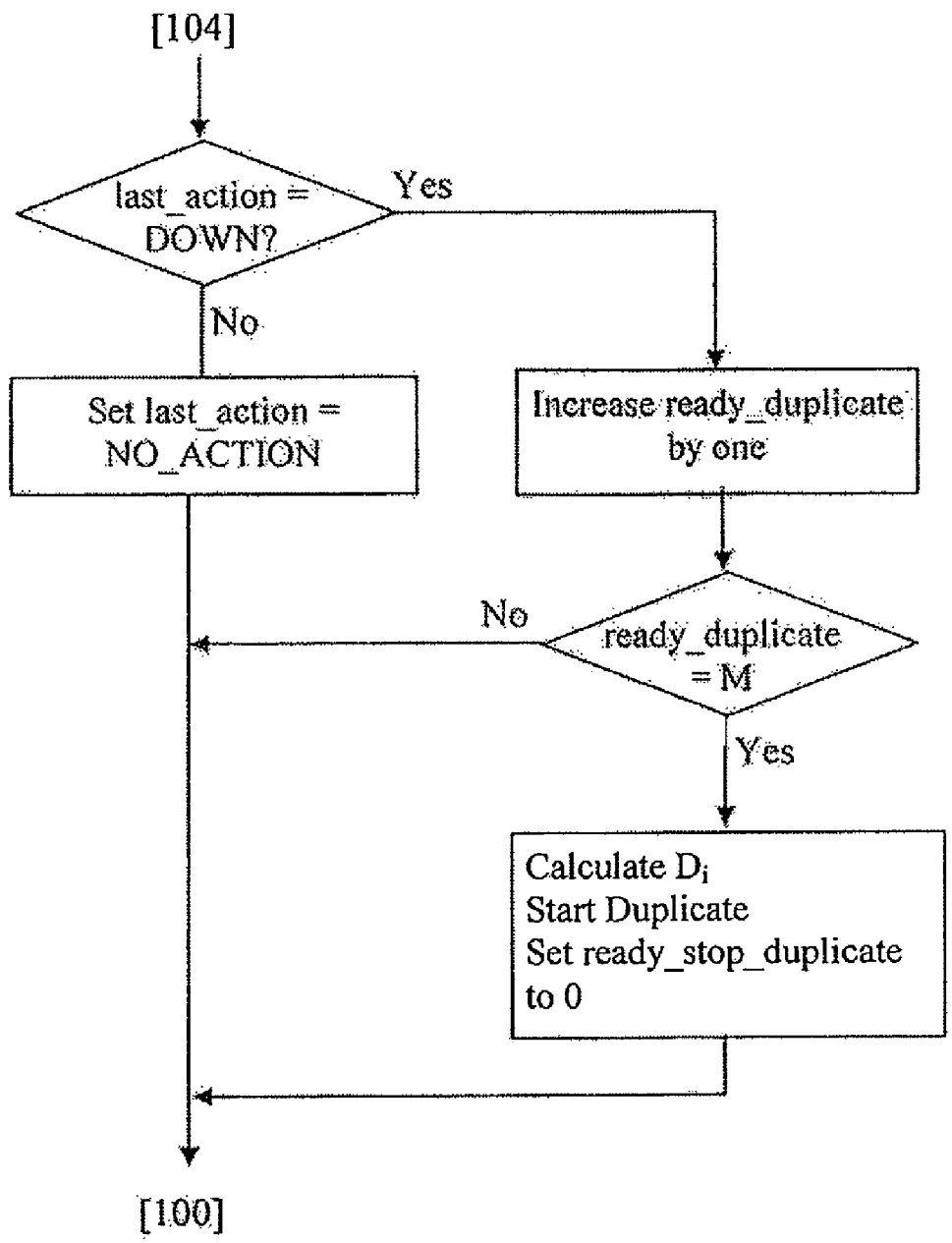
FIG. 8 is a flow diagram of the method for a network loss condition that starts packet duplication if the current packet loss rate is close to the previous packet loss rate (within threshold T) and the packet duplication is stopped.

FIG. 8 depicts control flow when the loss rate is above the maximum loss rate, the change in loss rate is less than threshold T, such as $|L_i-L_{i-1}|<T$ and duplication mode is not already set. In this mode, if variable last_action is set to DOWN the controller increases the variable ready_duplicate by 1 and then checks whether ready_duplicate has reached the threshold M for triggering packet duplication. If the threshold has been reached then a rate for duplication $D_i$ is calculated and duplication is started. The variable ready_stop_duplicate is reset to 0. It should be noted that the variable last_action was set to DOWN in FIG. 5 represents a network situation that the bit rate $B_i$ keeps increasing slowly without packet duplication while the video packet loss rate $L_i$ keeps lowering.

Continuing in FIG. 8, if the variable last_action is not set to DOWN the controller sets the variable last_action to NO_ACTION and returns to the flow of FIG. 4 for the next iteration.

What is claimed is:

1. A method for controlling a real-time media stream between a sender end and a receiver end, comprising:
 streaming from the sender end a plurality of media packets over a network at a bit-rate;
 determining a loss-rate for the media packets streamed from the sender end but not received at the receiver end;
 generating duplicate packets for a selected number of the media packets and streaming the duplicate packets over the network when the loss-rate is above a first loss-rate threshold; and
 varying the bit-rate of streaming the plurality of media packets over the network when the loss-rate is above a second loss-rate threshold, wherein determining the loss-rate for the media packets streamed but not received at the receiver end comprises
  receiving, at the sender end, a RTP Control Protocol Extended Report transmitted from the receiver end,
  using data in the RTP Control Protocol Extended Report, determining total number of packets R received at a receiver end, including any duplicate packets, and
  calculating the loss-rate, L, as L=S−R/S, where S is total number of data packets streamed from the sender end.

2. The method of claim 1 wherein determining the loss-rate comprises:
 determining a first loss rate for a first period of the streaming, and
 determining a second loss-rate for a second period of the streaming.

3. The method of claim 2 wherein varying the bit-rate of streaming the plurality of media packets over the network when the loss-rate is above the second loss-rate threshold comprises varying the bit-rate when difference between the first and second loss-rates is above the second loss-rate threshold.

4. The method of claim 3 wherein varying the bit-rate when the difference between the first and second loss-rates is above the second loss-rate threshold comprises increasing the bit rate when the second loss rate is less than the first loss rate, and decreasing the bit rate when the second loss rate is larger than the first loss rate.

5. A method for controlling a real-time media stream between a sender end and a receiver end, comprising:
 streaming from the sender end a plurality of media packets over a network at a bit-rate;
 determining a loss-rate for the media packets streamed from the sender end but not received at the receiver end;
 generating duplicate packets for a selected number of the media packets and streaming the duplicate packets over the network when the loss-rate is above a first loss-rate threshold;
 varying the bit-rate of streaming the plurality of media packets over the network when the loss-rate is above a second loss-rate threshold; and
 stopping the generating duplicate packets after the loss-rate exceeds the second loss-rate threshold.

6. A method for controlling a real-time media stream between a sender end and a receiver end, comprising:
 streaming from the sender end a plurality of media packets over a network at a bit-rate;
 determining a loss-rate for the media packets streamed from the sender end but not received at the receiver end;
 generating duplicate packets for a selected number of the media packets and streaming the duplicate packets over the network when the loss-rate is above a first loss-rate threshold;
 varying the bit-rate of streaming the plurality of media packets over the network when the loss-rate is above a second loss-rate threshold; and
 when the loss-rate is above the first loss-rate threshold and below the second loss rate threshold, increasing the selected number of media packets that are duplicated.

7. A method for controlling a real-time media stream between a sender end and a receiver end, comprising:
 streaming from the sender end a plurality of media packets over a network at a bit-rate,
 calculating a first loss-rate for the media packets streamed from the sender end but not received at the receiver end for a first period of the streaming, and
 repeating calculating the first loss-rate for successive periods of the streaming until the first loss-rate calculated is above a first loss rate threshold, and
  if the difference between the two first loss-rates most recently calculated is less than a second loss rate threshold, generating duplicate packets for a selected number of the media packets and streaming the duplicate packets over the network, and
  if the difference between the two first loss-rates most recently calculated is larger than the second loss rate threshold, varying the bit-rate of streaming the plurality of media packets over the network.

8. The method of claim 7 wherein calculating the first loss-rate comprises:
 receiving, at the sender end, a RTP Control Protocol Extended Report transmitted from the receiver end,
 using data in the RTP Control Protocol Extended Report, determining total number of packets R received at the receiver end, including any duplicate packets, and
 calculating the loss-rate, L, as L=S−R/S, where S is total number of data packets streamed from the sender end.

9. The method of claim 7 wherein varying the bit-rate of streaming the plurality of media packets over the network when the loss-rate is above the second loss-rate threshold comprises increasing the bit rate when the second loss rate is less than the first loss rate, and decreasing the bit rate when the second loss rate is larger than the first loss rate.

10. The method of claim 7 further including stopping the generating of duplicate packets if the difference between the two first loss-rates most recently calculated is larger than the second loss rate threshold.

11. The method of claim 7 further including increasing the selected number of media packets that are duplicated if the difference between the two first loss-rates most recently calculated is less than the second loss rate threshold.

12. A method for controlling a real-time media stream between a sender end and a receiver end, comprising:
 streaming from the sender end a plurality of media packets over a network at a bit-rate,
 receiving at the sender end a RTP Control Protocol Extended Report transmitted from the receiver end,
 using data in the RTP Control Protocol Extended Report, determining total number of packets R received at a receiver end, including any duplicate packets, and calculating a loss-rate, L, as L=(S−R)/S, where S is total number of data packets streamed from the sender end,
 generating duplicate packets for a selected number of the media packets and streaming the duplicate packets over the network when the loss-rate is above a first loss-rate threshold, and
 varying the bit-rate of streaming the plurality of media packets over the network when the loss-rate is above a second loss-rate threshold.

* * * * *